United States Patent [19]

Jones

[11] Patent Number: 5,572,864
[45] Date of Patent: Nov. 12, 1996

[54] SOLID-FUEL, LIQUID OXIDIZER HYBRID ROCKET TURBOPUMP AUXILIARY ENGINE

[75] Inventor: Herbert S. Jones, St. Tammany Parish, La.

[73] Assignee: Martin Marietta Corporation, Bethesda, Md.

[21] Appl. No.: 308,036

[22] Filed: Sep. 16, 1994

[51] Int. Cl.$^6$ .................................................. F02K 9/28
[52] U.S. Cl. ................................................ 60/220; 60/251
[58] Field of Search ............................... 60/39.02, 39.06, 60/204, 219, 220, 251, 254, 257, 259

[56] References Cited

U.S. PATENT DOCUMENTS

| | | | |
|---|---|---|---|
| 2,450,950 | 10/1948 | Goddard | 60/259 |
| 3,062,004 | 11/1962 | Dooley et al. | 60/259 |
| 3,488,950 | 1/1970 | Blackman et al. | 60/251 |
| 3,622,555 | 5/1972 | Ayers et al. | 60/220 |
| 4,291,232 | 9/1981 | Candone et al. | |
| 4,365,475 | 12/1982 | Dunlap. | |
| 4,598,552 | 7/1986 | Weber. | |
| 4,753,079 | 6/1988 | Sumitomo. | |
| 4,843,823 | 7/1989 | Freedman. | |
| 5,007,240 | 4/1991 | Ishida et al. | |
| 5,010,730 | 4/1991 | Knuth et al. | 60/251 |
| 5,032,271 | 7/1991 | Urry. | |
| 5,077,030 | 12/1991 | Yogev. | |
| 5,099,645 | 3/1992 | Schuler et al. | 60/219 |
| 5,111,662 | 5/1992 | Nicolin et al. | |
| 5,311,741 | 5/1994 | Blaize. | |

FOREIGN PATENT DOCUMENTS

| | | | |
|---|---|---|---|
| 646363 | 8/1962 | Canada | 60/251 |

*Primary Examiner*—Timothy S. Thorpe
*Attorney, Agent, or Firm*—Gay Chin; William H. Meise

[57] ABSTRACT

A propulsion thruster (10) includes a solid-fuel, liquid-oxidizer main rocket engine (11), a tank (22) of liquid oxygen, and a turbine (32)-driven pump (30) for pumping liquid oxygen to the main engine. A solid-fuel, liquid-oxidizer auxiliary engine (40) has its oxidizer input port (50) coupled to the output (30b) of the turbopump, for generating drive fluids for the turbine (32) of the turbopump. The temperature of the turbine drive fluids is reduced to prevent damage to the turbine, and the mass flow rate is increased, by injecting water from a tank (60) into the drive fluids at the output (48) of the auxiliary engine (40). Starting is enhanced by preventing cooling of the solid fuel by the liquid oxidizer, which is accomplished by applying gaseous oxygen from a tank (90) to the oxidizer input port (50) of the auxiliary engine (40).

19 Claims, 3 Drawing Sheets

SOLID-FUEL, LIQUID OXIDIZER HYBRID ROCKET TURBOPUMP AUXILIARY ENGINE

FIELD OF THE INVENTION

This invention relates to rocket thrusters, and more particularly to liquid/solid fueled hybrid auxiliary engines for operating the turbopump of a liquid/solid fueled hybrid main thruster.

BACKGROUND OF THE INVENTION

Thrusters or rocket engines for propulsion have been in use since antiquity for warfare. Such early rockets used solid propellant materials, notably slow-burning varieties of gunpowder. Gunpowder, however, is an explosive, rather than a propellant, and has proven to be unreliable when used for propelling rockets, because of the likelihood of explosion.

More modern solid propellants reduce the likelihood of explosion, but still suffer from the disadvantage that, once ignited, ignition tends to continue until the propellant is exhausted. Also, the thrust generation of a solid-propellant rocket depends, from moment to moment, upon the configuration of the partially-burned propellant; a propellant which is in the form of a solid block will burn at its surface, and produce less mass flow per unit time (W) of combustion or reaction products, compared with a propellant which is in the form of granules, having a much larger surface-area-to-mass ratio. Of course, the granules will be exhausted sooner than the block.

As a result of the problems with control of solid-fuel thrusters, later rockets, notably Goddard's and the German V-2 rockets, used fluid propellants, which could be valved to control thrust, and which did not suffer from changes in the configuration of the reacting material as with solid propellants. The fluid reactants, such as fuel and oxidizer, however, suffered from problems with control of the injection, so that too much of one or the other component might be injected at any moment, resulting in a tendency to explode if too much reactant was introduced into the combustion chamber, or to extinguish if too little was introduced. Either explosion or ignition extinction of the thruster could result in complete failure of a mission.

Liquid-oxidizer solid-fuel hybrid thrusters were devised in order to improve reliability. Such thrusters include a housing in which a solid fuel is located, and a tank of liquid oxidizer such as liquid oxygen ($LO_2$), with a control system for allowing oxidizer to flow from the tank to the solid-fuel housing. A modern solid fuel is Hydroxyl Terminated Polybutadiene (HTPB), a solid synthetic elastomer, which generates combustible vapor when heated. The mechanism by which solid HTPB becomes vapor is not well understood, but may include sublimation, or decomposition of the high molecular weight HTPB into smaller gaseous molecules; it may also involve a melt layer. However the combustible vapor form of the HTPB is formed, it reacts with gaseous oxygen to form the reaction products which provide the rocket thrust.

When substantial amounts of thrust are desired, as for launch of large vehicles or payloads, large amounts of reactant materials are required in order to produce mass flow of reaction products sufficient to provide the desired lift. These large mass flows result in a need for one or more pumps for pumping liquid oxygen from the liquid oxygen storage tank to the solid fuel housing. A large booster or rocket may require a mass flow of liquid oxygen of more than one ton per second during operation. During operation, the solid fuel housing in which the oxidizer reacts with the solid fuel may be at a considerable pressure, possibly in the range of 1000 pounds per square inch (PSI). The liquid oxygen pump must pump the oxidizer mass against the housing pressure. Pumping a ton or more of mass per second against a back pressure of 1000 PSI clearly requires a large amount of pump drive power. This power may be provided from the launch pad until the engine is operating, whereupon some reaction products may be tapped off during, and after, liftoff, to continue operation of the pump. Alternatively, the power may be provided by an auxiliary engine.

If an auxiliary engine is used to operate the pump in a hybrid thruster, it must be possible to turn the auxiliary engine on reliably, since the main thruster operates only when the auxiliary engine drives the pump to cause a flow of oxidizer to the solid fuel. A liquid fueled auxiliary engine might be used, but the presence of the liquid fuel itself reduces the reliability of the vehicle as a whole. An improved liquid-oxidizer solid-fuel hybrid rocket thruster is desired.

SUMMARY OF THE INVENTION

A propulsion engine according to the invention includes a solid-fuel main rocket engine with a first housing and a charge or grain of solid fuel contained therein, and an inlet port for oxidizer. The engine also includes a tank of liquid oxidizer, and a turbine-driven pump including an oxidizer inlet port coupled to the tank of liquid oxidizer and a high-pressure oxidizer outlet port coupled to the oxidizer inlet of the first housing. The turbine-driven pump has a turbine input port for accepting a flow of turbine drive vapors, whereby the flow of the turbine drive vapors through the turbine causes a pumped flow of the oxidizer to the solid fuel in the first housing, as a result of which the oxidizer and the fuel react to generate rocket thrust. An auxiliary engine is associated with the propulsion engine. The auxiliary engine includes a second housing, a charge or grain of solid fuel contained in the second housing, and an outlet at which at least a portion of the turbine drive vapors are generated during operation of the auxiliary engine. When in operation, the solid fuel of the auxiliary engine reacts with a gaseous component of the oxidizer for generating heat and combustion or reaction products. The second housing also includes an inlet for oxidizer, and the inlet is coupled to the oxidizer outlet port of the turbine-driven pump, so that, when the pump is operating, oxidizer is pumped from the tank to the main rocket engine for reacting with the solid fuel for generating thrust, and liquid oxidizer is also pumped from the liquid oxidizer tank to the auxiliary engine for generating the drive vapors for driving the turbine-driven pump. The propulsion engine may not start reliably, because the liquid oxidizer tends to cool the solid fuel as the liquid oxidizer becomes gaseous. This in turn tends to cool the solid fuel, so that it cannot form combustible vapors to react with the gaseous oxidizer, and thereby tends to prevent reaction of the fuel with the gaseous oxidizer and to delay, or even prevent, starting of the propulsion engine. According to another aspect of the invention, the propulsion engine also includes a tank of gaseous oxidizer, and a gaseous oxidizer coupling arrangement coupled to the tank of gaseous oxidizer and to the inlet port of the second housing, for providing gaseous oxidizer to the grain of solid fuel contained in the second housing, at least during start-up, whereby liquid oxidizer does not cool the solid fuel and tend to maintain it in solid form, thereby allowing the fuel to more readily react with the oxidizer, to thereby generate heat to aid in transmuting the solid fuel into its reactive vapor phase. According to another aspect of the invention, reliability of the system is enhanced, and propulsion engine weight is reduced, by injecting a noncombustible fluid into the auxiliary engine, which simultaneously reduces the temperature of the turbine drive fluid or vapors to reduce stress on the turbine, and increases the mass flow through the turbine, thereby increasing the turbine pump mass flow and power, without a corresponding increase in the mass flow through the auxiliary engine. In one embodiment of the invention, the noncombustible fluid is water, which is injected into the output port of the auxiliary engine to generate a mixture of reaction products and steam, at a lower temperature than that of the reaction products alone. In a particular embodiment of the propulsion engine, the second liquid coupling arrangement includes a throttling arrangement, for controllably modulating the flow of the noncombustible second liquid from its storage tank to the outlet port of the auxiliary engine, whereby the mass flow rate of the turbine drive fluid is modulated, which in turn modulates the turbine-driven pump, and thereby modulates the thrust. The solid fuel in the auxiliary engine may be of the same type as that in the main engine, and it may be Hydroxyl Terminated Polybutadiene. The liquid oxidizer may be $LO_2$, and the gaseous oxidizer may be $O_2$.

DESCRIPTION OF THE INVENTION

Figure 1:
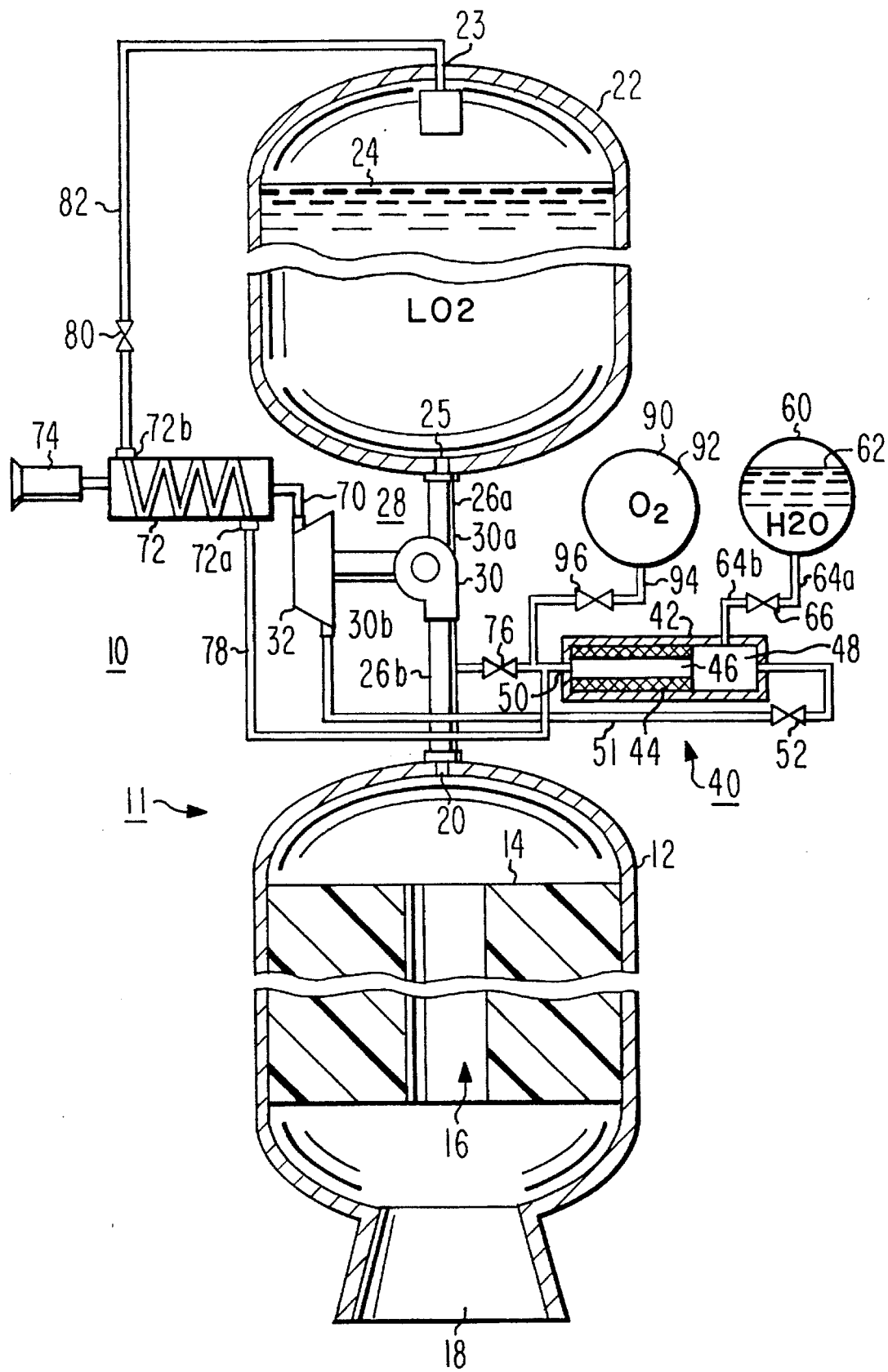
FIG. 1 is a simplified block diagram of a propulsion engine including a liquid-oxidizer solid-fuel hybrid main engine or thruster, a turbopump driven by an auxiliary engine, and a noncombustible liquid tank.

In FIG. 1, a propulsion engine 10 includes a main engine 11, which includes a housing 12 in which a shaped charge or "grain" of solid propellant fuel 14 is contained. Fuel 14 is configured with a central channel or "port" 16 which ends at a thrust port or nozzle 18, but as known in the art may be configured with a plurality of such ports. Housing 12 includes an inlet port 20 through which oxidizer in the form of liquid oxygen is introduced to the interior of the housing for contacting the solid fuel 14 for, through the intermediary fuel vapors, reacting therewith. The resulting combustion or reaction products generate pressure within housing 12, and result of expulsion of high-velocity mass from nozzle 18 to thereby generate the desired thrust.

The solid propellant fuel 14 contained within housing 12 of FIG. 1 is desirably hydroxyl terminated polybutadiene (HTPB), which, when thermally decomposed, burns with oxygen in a predictable manner. This burning may be viewed as spontaneous reaction of the solid fuel with oxygen to produce reaction products. More specifically, the burning may be viewed, for purposes of understanding why the invention works, as the reaction with gaseous oxygen of vapors leaving a liquid phase of the solid fuel. In the presence of gaseous oxygen, a film at the surface of the solid fuel initially reacts exothermically with gaseous oxygen, and the resulting heat tends to melt the solid fuel in the vicinity of the surface to liquid form, which releases enough vapors to react strongly with the liquid oxygen, after which the heat tends to vaporize the liquid fuel, and the reaction proceeds strongly.

A liquid oxygen tank 22 of FIG. 1 includes a charge of liquid oxygen 24. The liquid oxygen is coupled from tank 22, by way of an outlet port 25 and a portion 26a of a pipe, to the inlet port 30a of a pump portion 30 of a turbopump 28. In operation, pump 28 pumps liquid oxygen by way of its output port 30b and a pipe portion 26b to liquid oxygen inlet port 20 of housing 12, thereby generating pressure in pipe portion 26b.

Pump portion 30 of turbopump 28 of FIG. 1 is mechanically driven by a turbine 32. Turbine 32, in turn, is operated by turbine drive fluid derived from an auxiliary engine 40, and coupled from auxiliary engine 40 by way of a conduit, pipe or path 51 and a valve 52 (when valve 52 is open).

Auxiliary engine 40 of FIG. 1 includes a housing 42, and a shaped grain of solid fuel 44 therein. The shaped grain of solid fuel within housing 42 defines a central port 46. As with the case of main engine 11, the grain may define plural ports instead of single central port 45. Housing 42 also defines an oxidizer inlet port 50. When oxidizer is introduced into inlet port 50 of auxiliary engine 40, the solid fuel reacts therewith in a manner described below, generating hot reaction products, possibly at temperatures higher than 5000° F., which are channeled to a steam generation or mixing chamber 48. Mixing chamber 48 is connected by valve 52 and pipe 51 to turbine 32 of turbopump 28. If the reaction products produced by auxiliary engine 40 were to be coupled directly to turbine 32, a mass flow of extremely hot products would arrive at the turbine. Such a mass flow of hot products would tend to heat the turbine to a very high temperature, thereby generating temperature stresses tending to destroy the turbine, which might require a cooling system to maintain reliability. This problem is solved, and another advantage is gained, by a water tank 60, which contains a charge 62 of water. Water tank 60 communicates with mixing chamber 48 by way of pipe portions 64a and 64b and a valve 66 in its open state. During operation, water from tank 60 is injected into, or allowed to enter, mixing chamber 48. The water mixes with the reaction products produced by the engine, cooling the reaction products to a temperature, generally below 1500° F., which is within the capabilities of the turbine, and also generating an increased volume of gases or vapors as the water turns to steam. The turbine drive fluid mass flow is also increased by the water injection.

The mixture of steam and reaction products from mixing chamber 48 of auxiliary engine 40 of FIG. 1 flows by way of pipe 51 and open valve 52 to turbine 32, driving the turbine and pump 30 which is mechanically coupled thereto. The fluid outlet of turbine 32 is coupled by a pipe 70 to a heat exchanger 72, for extracting heat from the turbine outlet fluids before they reach an exhaust port 74. As mentioned above, pressurized liquid oxygen is generated at outlet port 30b of pump 30 during operation of the propulsion engine. The pressurized liquid oxygen is tapped from main pipe 26b by way of a valve 76, from which the pressurized liquid oxygen is made available to the oxidizer input port 50 of auxiliary engine 40 and a further pipe 78, which leads to an inlet port 72a of heat exchanger 72. Heat is exchanged in heat exchanger 72 between the outlet fluids of turbine 32 and the pressurized liquid oxygen flowing from pump 30, through valve 76 and pipe 78, thereby resulting in the production of heated, pressurized oxygen at outlet port 72b of heat exchanger 72. This heated, pressurized oxygen is at a higher pressure than the pressure within oxygen tank 22. Tank 22 is pressurized, to force or urge the liquid oxygen toward tank outlet 25, by coupling the heated, pressurized oxygen from outlet port 72b of heat exchanger 72, by way of a valve 80 and a pipe 82 to a pressurizing inlet port 23 of tank 22.

Normal, post-start-up operation is described above. At start-up, the turbine 32 must be driven to move liquid oxygen from tank 22 to the main engine 11. In order for the turbine to be driven, auxiliary engine 40 must produce turbine drive fluid in the form of warm gas. This, in turn, means that solid fuel 44 in auxiliary engine 40 must be oxidized to generate heat. In turn, this means that oxidizer must be present at its inlet port 50. However, pump 30 is not initially in operation, so no liquid oxygen is available at inlet port 50. One might think that a separate supply of liquid oxygen, as for example by means of a pipe extending directly from outlet port 25 of tank 22 to inlet port 50 of auxiliary engine 40, would be ideal. It has been found, however, that introduction of liquid oxygen into the auxiliary engine begins to vaporize, and absorbs heat of vaporization from the solid fuel, thereby dramatically reducing the temperature of the solid fuel, and reducing its ability to generate combustible vapors. This in turn effectively "freezes" the solid fuel, so that such limited reaction as may take place at the surface does not generate sufficient heat to cause the solid fuel to melt, so that progression of combustion is very slow, and starting of the main engine may not occur, or may be delayed if it does occur.

According to an aspect of the invention, an additional tank 90 of gaseous oxygen 92 is coupled by way of a pipe 94 and a valve 96 (in its open state), as illustrated in FIG. 1. Engine starting is initiated by opening valve 96, to allow gaseous oxygen to flow into inlet port 50 of auxiliary engine 40, and a few moments later simultaneously opening valves 52, 76, and 80, to allow reaction products from auxiliary engine 40 to drive the turbine, and to allow pressurized liquid oxygen to enter the auxiliary engine. A few moments later, valve 66 is opened to allow water to enter the mixing chamber and steam to be generated.

Concurrently with the opening of valve 76 as described above, for starting operation of the engine, valve 96 is closed to prevent the filling of tank 90 with liquid oxygen. As an alternative to timed operation of valves 76 and 96, a check valve can be placed in series with valve 96, so that liquid oxygen cannot flow to tank 90 even if valve 96 is open. The check valve smooths the transition between the gaseous oxygen operating state and the liquid oxygen operating state of the auxiliary engine.

The described arrangement is thermally efficient, in that the transfer of heat from the combustion gases generated by the auxiliary engine to the water is almost complete. The resulting turbine drive fluid (the steam/combustion product mixture) has detergent properties which tend to make the turbine run clean, whereas, when a simple combustion gas generator is used, it must be run at mixture ratios which are far from the mixture which is optimum for energy generation, in order to keep the gas temperature within a range which the turbine can withstand. When such a simple gas generator is operated at non-optimal mixture ratios, carbon is deposited on the turbine blades, which tends to reduce the turbine efficiency during a mission, and which then requires cleaning before the next mission. The operation at non-optimal mixture ratios also means that, in order to generate the amount of power (energy per unit time) required to drive the turbopump, a simple gas generator must carry much more fuel than one according to the invention, because the fuel is used inefficiently in that a portion is not burned. Thus, the weight of the tank of water required for the invention is at least partially offset by the saving in auxiliary engine fuel weight.

Analysis under the assumption of constant flow of water and consequently constant turbine temperature, shows that throttling of the propulsion system to very low values by restricting water injection will cause the turbine to transition from a predominantly thermally driven state to a predominantly mass driven state. Therefore, the addition of water, over an initial amount of water required to maintain the turbine drive fluid temperature, results in a decrease in temperature of the drive fluid, which decreases the power available to the turbine, which effectively throttles the system. Analysis also shows that the depth of the throttle (reduction of thrust below 100%) depends on the operating temperature of the turbine at maximum power level. For a system with a nominal 100% turbine temperature of 1600° F., the maximum throttle depth is 70%, which is expected to be sufficient for most purposes.

Figure 2:
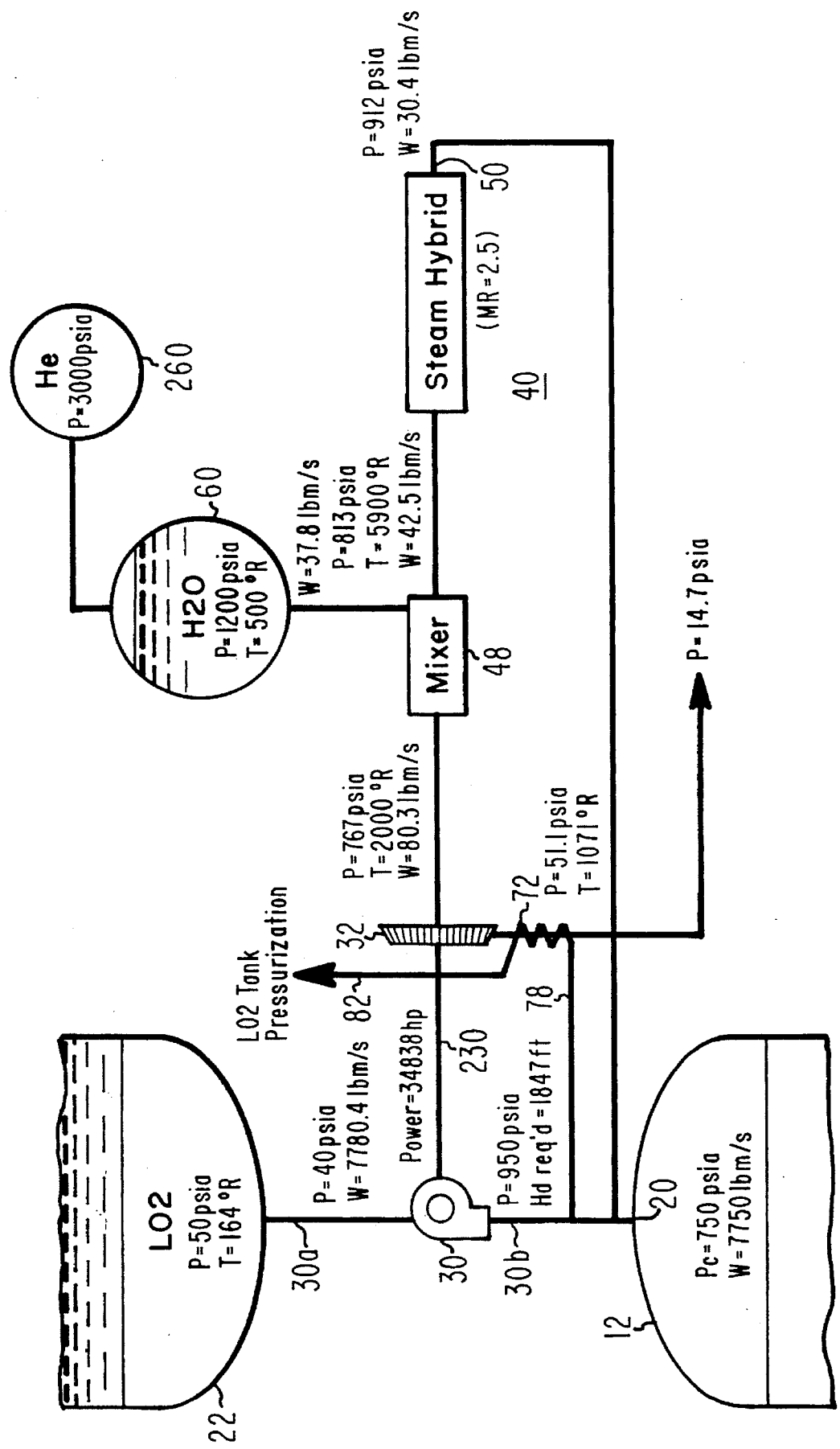
FIG. 2 is a schematic layout of the arrangement of FIG. 1, with thermodynamic information relating to a particular embodiment of the invention.

FIG. 2 is a schematic representation of the system of FIG. 1, showing the pressures, mass flow and temperatures at various locations in the system during operation at 100% throttle, or full output. Elements corresponding to those of FIG. 1 are designated by like reference numerals. The mechanical connection between the turbine (T) 32 and the associated pump (P) 30 is illustrated as 230. Under these conditions, a typical system would have the $LO_2$ pressure in tank 22 at 50 PSI absolute (PSIA), at a temperature of 164° Rankine (R). The pressure in pipe 30a under these conditions is 40 PSIA, and the mass flow rate of liquid oxygen is 7780.4 lbm/s. The pump 30 receives 34,838 mechanical horsepower (hp) from the turbine 32, and produces a liquid oxygen pressure of 950 PSIA at pump outlet 30b. Plumbing losses drop the liquid oxygen pressure at the oxidizer inlet port 50 of auxiliary engine 40 to 912 PSIA. The reaction products entering mixing chamber 48 are at a pressure of 813 PSIA and at a temperature of 5900° R., with a mass flow W=42.5 lbm/s. In the mixing chamber 48, the reaction products are mixed with a mass flow W=37.8 lbm/s of water at ambient temperature from storage tank 60. Water storage tank 60 is under sufficient pressure to force the water into the system. In this example, the water tank is pressurized to 1200 PSIA by a tank 260 of helium, pressurized to 3000 PSIA. At the outlet of the mixing chamber 48, the pressure of the turbine drive fluid is 767 PSIA, the temperature is 2000° R., and the mass flow is W=80.3 lbm/s. At the output of turbine 32, the pressure is 51.1 PSIA, and the temperature is 1071° R. At the exhaust of the turbine, the pressure is atmospheric pressure, which may range down from 14.7 PSIA. Since some of the liquid oxygen pumped by pump 30 is diverted to the auxiliary engine, the pressure at the oxidizer inlet 20 of housing 12 is 930 PSIA at a mass flow rate of W=7750 lbm/s. The reaction of this flow of oxidizer with the solid fuel results in a thrust of 3,000,000 lbf.

Figure 4:
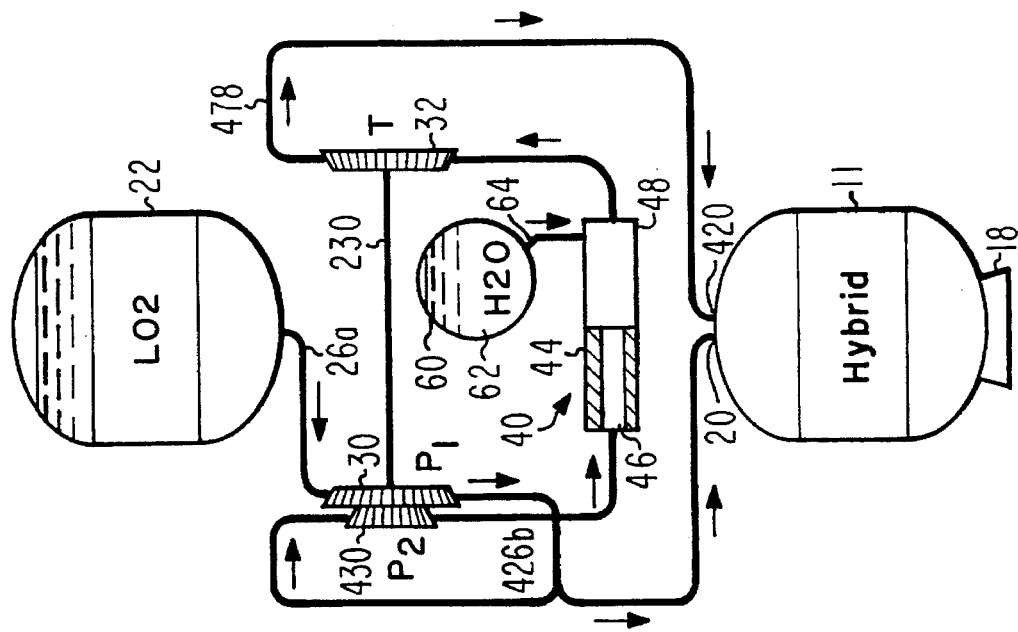
FIG. 4 is a simplified representation of a system according to the invention, operating closed-loop.
Figure 3:
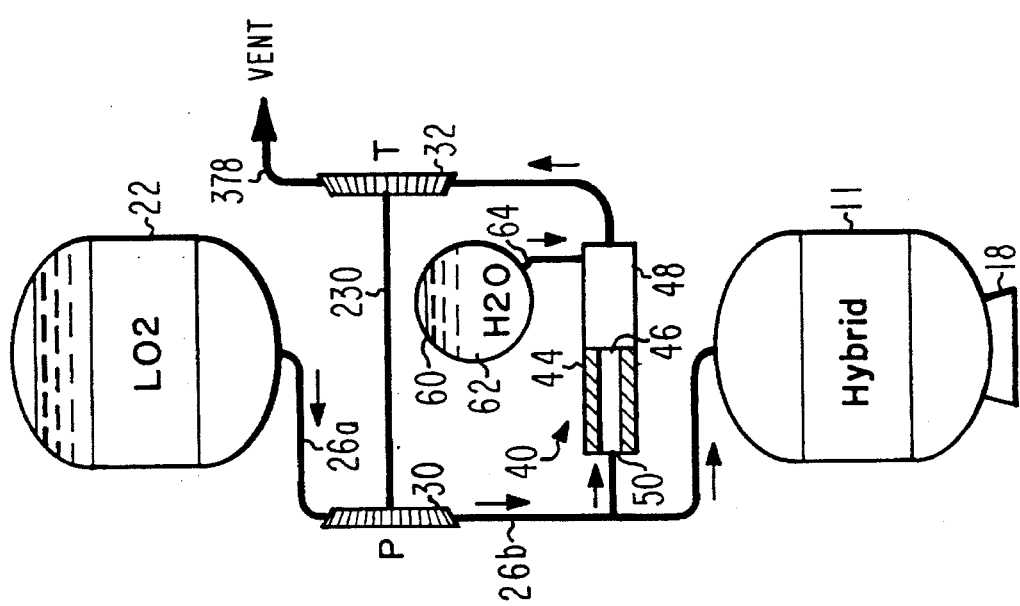
FIG. 3 is a simplified representation of a system according to the invention, operating open-loop.

FIG. 3 illustrates an open or vented propulsion system. Elements of FIG. 3 corresponding to those of FIGS. 1 and 2 are designated by the same reference numerals. In FIG. 3, the turbine drive fluids flow from turbine 32 by way of a path 378 to a vent (not illustrated) after being used to drive the turbine 32 and associated pump 30. In the closed system of FIG. 4, the turbine drive fluids, instead of being vented as in FIG. 3 after being used by the turbine 32, are coupled by a path 478 to an additional input port 420 of solid-fuel rocket engine 11, so that the main propulsion mass flow is increased. Also in FIG. 4, the oxidizer flow rates of the main engine 11 and the auxiliary engine 40 are maintained in a fixed relationship by associating a second pump 430 ($P_2$) on the same shaft with pump 30, and pumping the liquid oxidizer from the output of the main pump ($P_1$) to the oxidizer input port (50) of the auxiliary engine (40), rather than allowing uncontrolled flow, as in FIG. 1.

Other embodiments will be apparent to those skilled in the art. For example, while the liquid oxidizer has been described as $LO_2$, it could be any other oxidizer which may be used in a propulsion system. While the solid fuel has been described as HTPB, any other solid fuel could be used, such as carboxyl terminated polybutadiene (CTPB), polyethylene, or PBAN.

What is claimed is:

1. A propulsion engine, comprising:

a solid-fuel main rocket engine including a first housing and a grain of solid fuel contained therein, and an inlet for oxidizer;

a tank of liquid oxidizer;

a turbine-driven pump including an oxidizer inlet port coupled to said tank of liquid oxidizer and an oxidizer outlet port coupled to said inlet of said first housing, and also including a turbine input port for accepting flow of turbine drive fluid, whereby the flow of said turbine drive fluid through said turbine causes a pumped flow of said oxidizer to said solid fuel, whereby said oxidizer and said fuel react to generate rocket thrust;

an auxiliary engine including a second housing, a grain of solid fuel contained therein, and an outlet at which at least a portion of said drive fluids are generated during operation of said auxiliary engine, a phase of said solid fuel of said auxiliary engine reacting with a phase of said oxidizer for generating heat and reaction products, said second housing also including an inlet for oxidizer coupled to said oxidizer outlet port of said turbine-driven pump, whereby, when said pump is operating, oxidizer is pumped from said tank to said main rocket engine for generating thrust, and oxidizer is also pumped from said tank to said auxiliary engine for reacting with said grain in said auxiliary engine for generating said drive fluids for driving said turbine-driven pump, whereby said propulsion engine may not start reliably because said liquid oxidizer tends to cool said solid fuel as said liquid oxidizer becomes gaseous, and thereby tends to prevent reaction of said fuel with said oxidizer;

a tank of gaseous oxidizer; and gaseous oxidizer coupling means coupled to said tank of gaseous oxidizer and to said inlet port of said second housing, for providing gaseous oxidizer to said grain of solid fuel contained in said second housing, at least during start-up, whereby liquid oxidizer does not cool said solid fuel, thereby allowing said fuel to more readily react with said oxidizer, to thereby generate heat to aid said solid fuel to generate flammable vapor.

2. An engine according to claim 1, further comprising:

a tank of a noncombustible second liquid; and second liquid coupling means coupled to said outlet of said auxiliary engine and to said tank of noncombustible second liquid, for generating a flow of said second liquid from said tank of noncombustible second liquid to said outlet of said auxiliary engine during operation of said auxiliary engine, whereby said second liquid is vaporized and mixed with said portion of said drive fluids produced by said auxiliary engine to produce drive fluids for said turbine, whereby the temperature of said drive fluids is reduced, and the mass flow rate is increased.

3. An engine according to claim 2, wherein said second liquid coupling means comprises second liquid throttling means, for controllably modulating said flow of said noncombustible second liquid from said tank to said outlet port of said auxiliary engine, whereby said mass flow rate is modulated, which in turn modulates said turbine-driven pump, and thereby modulates said thrust.

4. An engine according to claim 2, wherein said noncombustible second liquid is water.

5. An engine according to claim 1, wherein said solid fuel in said main rocket engine is of the same type as said solid fuel contained in said auxiliary engine.

6. An engine according to claim 1, wherein said solid fuel in said auxiliary engine is HTPB.

7. An engine according to claim 1, wherein said gaseous oxidizer is oxygen.

8. An engine according to claim 1, wherein said liquid oxidizer is liquid oxygen.

9. A propulsion engine, comprising:

a solid-fuel main rocket engine including a first housing and a charge of solid fuel contained therein, and an inlet for oxidizer, a vapor phase of said solid fuel reacting with a gaseous component of said oxidizer for generating heat and reaction products which provide thrust;

a tank of liquid oxidizer;

a turbine-driven pump including an oxidizer inlet port coupled to said tank of liquid oxidizer and an oxidizer outlet port coupled to said inlet of said first housing, and also including a turbine input port for accepting flow of turbine drive fluids, whereby the flow of said turbine drive fluids through said turbine causes a pumped flow of said oxidizer to said solid fuel, whereby said oxidizer and said fuel react to generate rocket thrust;

an auxiliary engine including a second housing, a grain of solid fuel contained therein, and an outlet at which at least a portion of said drive fluids are generated during operation of said auxiliary engine, said second housing also including an inlet for oxidizer coupled to said oxidizer outlet port of said turbine-driven pump, whereby, when said pump is operating, oxidizer is pumped from said tank to said main rocket engine for generating thrust, and oxidizer is pumped from said tank to said auxiliary engine, for reacting with said solid fuel contained therein, for generating said drive fluids, for driving said turbine-driven pump;

a tank of noncombustible second liquid; and second liquid coupling means coupled to said outlet of said auxiliary engine and to said tank of noncombustible second liquid, for generating a flow of said second liquid from said tank of noncombustible second liquid to said outlet of said auxiliary engine during operation of said auxiliary engine, whereby said second liquid is vaporized and mixed with said portion of said drive fluids produced by said auxiliary engine to produce said drive fluids for said turbine, whereby the temperature of said drive fluids is reduced to thereby reduce temperature stresses on said turbine, and the mass flow rate of said drive fluids is enhanced.

10. An engine according to claim 9, wherein said second liquid coupling means comprises second liquid throttling means, for controllably modulating said flow of said noncombustible second liquid from said tank to said outlet port of said auxiliary engine, whereby said mass flow rate is modulated, which in turn modulates the flow of said drive fluids to said turbine-driven pump, and thereby modulates said thrust.

11. An engine according to claim 9, wherein said non-combustible second liquid is water.

12. An engine according to claim 9, wherein said solid fuel in said main rocket engine is of the same type as said solid fuel contained in said auxiliary engine.

13. An engine according to claim 9, wherein said solid fuel in said auxiliary engine is HTPB.

14. An engine according to claim 9, further comprising:

a tank of gaseous oxidizer coupled to said inlet port of said second housing, for providing gaseous oxidizer to said grain of solid fuel contained in said second housing, at least during start-up, whereby liquid oxidizer does not cool said solid fuel to thereby tend to maintain it in solid form, thereby allowing said fuel to more readily react with said oxidizer, to thereby generate heat to aid in transmuting said solid fuel into its readily combustible vapor phase.

15. An engine according to claim 14, wherein said gaseous oxidizer is oxygen.

16. An engine according to claim 9, wherein said liquid oxidizer is liquid oxygen.

17. A method for generating thrust, comprising the steps of:

storing liquid oxidizer in a tank for, in the presence of a solid propellant, reacting therewith to produce thrust;

using a pump, pumping said liquid oxidizer from said tank to a main rocket engine containing said solid propellant, to thereby generate said thrust;

using said pump, pumping said liquid oxidizer from said tank to an auxiliary engine containing solid propellant, to thereby generate at least a component of turbine drive fluids;

coupling said turbine drive fluids to a turbine mechanically coupled to said pump, for thereby driving said turbine and pump to implement said steps of pumping said liquid oxidizer, whereby said drive fluids may tend to degrade said turbine; and injecting water into said portion of said drive fluids generated by said auxiliary engine, to thereby cool said component of said drive fluids generated by said auxiliary engine to reduce said tendency to degradation, and also to thereby increase the mass quantity of said drive fluids flowing through said turbine, which tends to reduce the amount of said solid fuel which must be reacted per unit time by said auxiliary engine to maintain said pump operation.

18. A method according to claim 17, wherein said step of injecting water includes the step of modulating the flow of said water for controlling said thrust.

19. A method for generating thrust, comprising the steps of:

storing liquid oxidizer in a tank for, when vaporized in the presence of the vapor phase of a solid propellant, reacting therewith to produce thrust;

using a pump, pumping said liquid oxidizer from said tank to a main rocket engine containing said solid propellant, to thereby generate said thrust;

using said pump, pumping said liquid oxidizer from said tank to an auxiliary engine containing solid propellant, to thereby generate at least a portion of turbine drive fluids, said liquid oxidizer, as it vaporizes, tending to reduce the temperature of said solid propellant, which thereby tends to prevent said solid propellant from entering said vapor phase, whereby the reaction may be delayed, and thrust may therefore not begin reliably;

coupling said drive fluids to a turbine mechanically coupled to said pump, for thereby implementing said steps of pumping said liquid oxidizer; and in conjunction with the beginning of said steps of pumping said liquid oxidizer, flowing gaseous oxidizer from a tank of gaseous oxidizer to said auxiliary engine, to thereby allow reaction of a portion of said propellant with said gaseous oxidizer, which tends to improve the reliability of said beginning of thrust, by reducing said tendency to reduce the temperature of said solid propellant.

* * * * *